United States Patent
Chun et al.

(10) Patent No.: US 9,853,828 B2
(45) Date of Patent: Dec. 26, 2017

(54) METHOD AND APPARATUS FOR MANAGING ENERGY THROUGH VIRTUALIZATION BY GROUPING TERMINAL CONTROLLERS

(75) Inventors: Ji-won Chun, Gyeonggi-do (KR); Dae-dong Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1116 days.

(21) Appl. No.: 13/604,394

(22) Filed: Sep. 5, 2012

(65) Prior Publication Data
US 2013/0131881 A1    May 23, 2013

(30) Foreign Application Priority Data
Nov. 22, 2011  (KR) .................. 10-2011-0122399

(51) Int. Cl.
 *H04L 12/28* (2006.01)
 *H04L 12/42* (2006.01)
 *H05B 37/02* (2006.01)

(52) U.S. Cl.
 CPC .... H04L 12/2816 (2013.01); *H04L 2012/421* (2013.01); *H05B 37/0272* (2013.01); *Y10T 307/477* (2015.04)

(58) Field of Classification Search
 CPC .................. H04L 12/2816; H04L 2012/421
 USPC ........................................................ 700/295
 See application file for complete search history.

(56) References Cited

U.S. PATENT DOCUMENTS

| | | | | |
|---|---|---|---|---|
| 6,731,080 | B2* | 5/2004 | Flory .............. | H05B 41/36 315/312 |
| 7,800,812 | B2* | 9/2010 | Moskowitz ............ | E06B 9/24 340/426.27 |
| 2002/0047628 | A1* | 4/2002 | Morgan ............... | G09G 3/14 315/291 |
| 2004/0122930 | A1* | 6/2004 | Pasternak ........... | H04L 12/2602 709/223 |
| 2004/0160199 | A1* | 8/2004 | Morgan ................ | A01M 1/04 315/312 |
| 2005/0035717 | A1* | 2/2005 | Adamson ............ | H05B 37/029 315/150 |
| 2006/0009254 | A1* | 1/2006 | Kanazawa .......... | H04M 1/6041 455/553.1 |
| 2007/0291483 | A1* | 12/2007 | Lys .................. | A01M 1/04 362/227 |
| 2008/0133065 | A1* | 6/2008 | Cannon ................ | H04L 12/10 700/295 |
| 2009/0153352 | A1* | 6/2009 | Julio ................ | H05B 33/0863 340/4.3 |

(Continued)

*Primary Examiner* — Jennifer L Norton
(74) *Attorney, Agent, or Firm* — Staas & Halsey LLP

(57) ABSTRACT

A terminal control apparatus and a central control apparatus may control at least one terminal device that consumes energy in an energy management system while obtaining the same effect as when virtual equipment is used. A first terminal control apparatus may receive a control command related to a first terminal device from a central control apparatus or a second terminal control apparatus included in the energy management system. The first terminal control apparatus may determine whether the first terminal device matches the first terminal control apparatus, and selectively transmit the control command to a third terminal control apparatus or selectively control the first terminal device according to the control command, based on the determination.

14 Claims, 7 Drawing Sheets

(56) References Cited

U.S. PATENT DOCUMENTS

| | | | |
|---|---|---|---|
| 2009/0315485 A1* | 12/2009 | Verfuerth | H05B 37/0272 315/320 |
| 2010/0109577 A1* | 5/2010 | Loughrey | H05B 37/0254 315/312 |
| 2011/0184577 A1* | 7/2011 | Ilyes | H05B 37/0272 700/295 |
| 2012/0040606 A1* | 2/2012 | Verfuerth | H05B 37/0218 455/7 |
| 2012/0101639 A1* | 4/2012 | Carralero | G06F 1/26 700/286 |
| 2012/0274222 A1* | 11/2012 | Verfuerth | H05B 37/0227 315/158 |
| 2013/0026953 A1* | 1/2013 | Woytowitz | H05B 37/0263 315/312 |

* cited by examiner

//  METHOD AND APPARATUS FOR MANAGING ENERGY THROUGH VIRTUALIZATION BY GROUPING TERMINAL CONTROLLERS

CROSS-REFERENCE TO RELATED APPLICATIONS

This application claims the benefit of Korean Patent Application No. 10-2011-0122399, filed on Nov. 22, 2011, in the Korean Intellectual Property Office, the disclosure of which is incorporated herein in its entirety by reference.

BACKGROUND

1. Field

One or more aspects disclosed herein relate to a system and apparatus for managing and controlling energy, and more particularly, to a method and apparatus for easily managing and controlling energy by grouping terminal controllers.

2. Description of the Related Art

Today, as the supply of fossil energy is being exhausted, and the cost of energy consumption rises, much attention has been paid to efficient use of energy. An amount of energy consumed in buildings occupies a large percentage of a total amount of energy consumed in various domains. In particular, since a large building includes several hundred to several thousand devices consuming energy, e.g., lighting devices, cooling/heating devices, water supply devices, and disaster preventing devices, an amount of energy consumed in the building may vary greatly according to a method of operating such terminal devices. Thus, effective management of energy consumed in the building is a very important factor in operating the building. Interests in efficient energy management have recently been extended to a household domain, and systems for efficiently managing devices consuming energy in a house have been developed. In general, such a system may be referred to as a building energy management system (BEMS) when the system is related to a building, and may be referred to as a home energy management system (HEMS) when the system is related to a house.

FIG. 1 is a diagram illustrating a structure of a conventional BEMS 100. Referring to FIG. 1, each of terminal devices 140 consuming energy is controlled by one of terminal controllers 130, and each of the terminal controllers 130 is controlled by one of field controllers 120. A central controller 110 controls the field controller 120 to control the terminal devices 140. For example, the field controllers 120 may control all lighting devices in a building, and the terminal controllers 130 may control lighting devices installed on a particular floor of the building. For the record, a terminal controller may be referred to as a unit controller depending on a system; however, for the purpose of better understanding of the present invention, such unit controller will be referred to as a terminal controller throughout this application.

According to the conventional method, equipment should be installed according to a protocol of an energy management system. Also, if terminal devices, such as a sensor, a lighting device, and valves, are additionally installed, a controller should be programmed in relation to the additional installment and a number of terminal devices that are operable is limited. Furthermore, many efforts should be made to maintain and repair the energy management system. For example, according to the conventional method, the terminal controller 130 is operated dependently on the field controller 120. Thus, when the terminal device 140 or the terminal controller 130 is added, changed, or removed, settings regarding the terminal device 140 or the terminal controller 130 should be changed in the field controller 120. Also, the field controller 120 is compatible with only a particular type of the terminal controller 130, and a user will experience inconvenience when a different type of a terminal controller is used. Furthermore, when one of the field controllers 120 malfunctions, all terminal controllers 130 and terminal devices 140 subject to the field controller 120 cannot be controlled.

SUMMARY

Additional aspects and/or advantages will be set forth in part in the disclosure which follows and, in part, will be apparent from the disclosure, or may be learned by practice of the invention.

One or more aspects of the present invention provide a terminal controller and a central controller capable of efficiently managing an energy management system by constructing an equipment and network for controlling terminal devices consuming energy, adding new equipment, and changing a system construction in a simple manner.

According to an aspect of the present invention, there is provided a first terminal control apparatus for controlling at least one terminal device that consumes energy in an energy management system, the first terminal control apparatus including a control command receiving unit for receiving a control command related to a first terminal device from at least one of a central control apparatus and a second terminal control apparatus included in the energy management system; a determination unit for determining whether the first terminal device matches the first terminal control apparatus; a control command transmitting unit for selectively transmitting, based on the determination of the determination unit, the control command to a third terminal control apparatus; and a terminal device control unit for selectively controlling, based on the determination of the determination unit, the first terminal device, according to the control command. The first terminal control apparatus, the second terminal control apparatus, and the third terminal control apparatus are included in one terminal control group.

The first terminal control apparatus may be connected to the other terminal control apparatuses included in the terminal control group, in a ring fashion.

The first terminal control apparatus may be connected to the other terminal control apparatuses included in the terminal control group, in a mesh fashion.

If the determination unit determines that the first terminal device does not match the first terminal control apparatus, the control command transmitting unit may transmit the control command to the third terminal control apparatus.

If the determination unit determines that the first terminal device matches the first terminal control apparatus, the terminal device control unit may control the first terminal device, based on the control command.

The first terminal control apparatus may further include a storage unit for storing information about at least one terminal device matching the first terminal control apparatus. The determination unit may determine whether the first terminal device matches the first terminal control apparatus, based on the information about the at least one terminal device.

The determination unit may determine whether the control command includes a sub control command related to a second terminal device, and determine whether the second terminal device matches the first terminal control apparatus when it is determined that the control command includes a sub control command related to the second terminal device.

The first terminal control apparatus may further include a storage unit for storing information about at least one terminal control apparatus connected to the first terminal control apparatus from among the terminal control apparatuses included in the terminal control group. The control command transmitting unit may transmit the control command to the third terminal control apparatus, based on the information about the at least one terminal control apparatus.

The information about the at least one terminal control apparatus may include internet protocol (IP) information of the third terminal control apparatus.

The determination unit may determine whether the control command is to be handled by the terminal control group, and discard the control command when it determines that the control command is not to be handled by the terminal control group.

The control command may include at least one group identifier (ID), and the determination unit may determine that the control command is to be handled by the terminal control group, based on an ID of the terminal control group and the at least one group ID included in the control command.

According to another aspect of the present invention, there is provided a central control apparatus for controlling a plurality of terminal devices that consume energy in an energy management system, the central control apparatus including a group generation unit for generating a terminal control group to include a first terminal control apparatus matching at least one terminal device and a second terminal control apparatus matching at least one terminal device from among the plurality of terminal devices; and a control command transmitting unit for transmitting a control command related to the at least one terminal device matching the first terminal control apparatus to at least one of the first terminal control apparatus and the second terminal control apparatus.

The group generation unit may generate the terminal control group in such a manner that terminal control apparatuses included in the terminal control group are connected in a ring fashion.

The group generation unit may generate the terminal control group in such a manner that terminal control apparatuses included in the terminal control group are connected in a mesh fashion.

The control command may include a device identifier (ID) of the at least one terminal device matching the first terminal control apparatus. The device ID may be used to determine whether the at least one terminal device matches a terminal control apparatus receiving the control command.

The control command transmitting unit may transmit the control command to a terminal control apparatus belonging to a terminal control group that is different from the terminal control group.

The control command may include a group ID. The group ID may be used to determine the terminal control apparatus receiving the control command is to handle the control command.

The group generation unit may generate an upper-rank control group including a plurality of terminal control groups.

The control command transmitting unit may broadcast the control command.

According to another aspect of the present invention, there is provided a method of controlling at least one terminal device that consumes energy in an energy management system, performed by a first terminal control apparatus, the method including receiving a control command related to a first terminal device from at least one of a central control apparatus and a second terminal control apparatus included in the energy management system; determining whether the first terminal device matches the first terminal control apparatus; selectively transmitting, based on the determination, the control command to a third terminal control apparatus; and selectively controlling, based on the determination, the first terminal device according to the control command. The first terminal control apparatus, the second terminal control apparatus, and the third terminal control apparatus are included in one terminal control group.

According to another aspect of the present invention, there is provided a method of controlling a plurality of terminal devices that consume energy in an energy management system, performed by a central control apparatus, the method including generating a terminal control group to include a first terminal control apparatus matching at least one terminal device and a second terminal control apparatus matching at least one terminal device from among the plurality of terminal devices; and transmitting a control command related to the at least one terminal device matching the first terminal control apparatus to at least one of the first terminal control apparatus and the second terminal control apparatus.

According to another aspect of the present invention, there is provided a computer readable recording medium having recorded thereon a computer program for executing a method of controlling at least one terminal device that consumes energy in an energy management system, which is performed by a first terminal control apparatus, the method including receiving a control command related to a first terminal device from at least one of a central control apparatus and a second terminal control apparatus included in the energy management system; determining whether the first terminal device matches the first terminal control apparatus; selectively transmitting, based on the determination, the control command to a third terminal control apparatus; and selectively controlling, based on the determination, the first terminal device according to the control command. The first terminal control apparatus, the second terminal control apparatus, and the third terminal control apparatus are included in one terminal control group.

According to another aspect of the present invention, there is provided a computer readable recording medium having recorded thereon a computer program for executing a method of controlling a plurality of terminal devices that consume energy in an energy management system, which is performed by a central control apparatus, the method including generating a terminal control group to include a first terminal control apparatus matching at least one terminal device and a second terminal control apparatus matching at least one terminal device from among the plurality of terminal devices; and transmitting a control command related to the at least one terminal device matching the first terminal control apparatus to at least one of the first terminal control apparatus and the second terminal control apparatus.

According to another aspect of the present invention, there is disclosed a first terminal controller among a plurality of terminal controllers, the first terminal controller including a control command receiving unit to receive a command from a central controller or a second terminal controller among the plurality of terminal controllers and a determination unit to determine whether to transmit the command to a third terminal controller among the plurality of terminal controllers or to control a terminal device directly connected to the first terminal controller, based on information included in the command. The first terminal controller, the second terminal controller, and the third terminal controller may be included in one terminal control group in an energy management system which includes the central controller, the terminal control group, and the plurality of terminal controllers.

The plurality of terminal controllers may be arranged in a predetermined configuration, and the plurality of terminal controllers are classified into a terminal control group according to predetermined criteria.

The predetermined configuration may include at least one of a ring fashion, a mesh fashion, and a tree fashion, and the predetermined criteria may include at least one of determining whether the plurality of terminal controllers control terminal devices performing a same operation and determining whether the plurality of terminal controllers control terminal devices in a same geographic area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
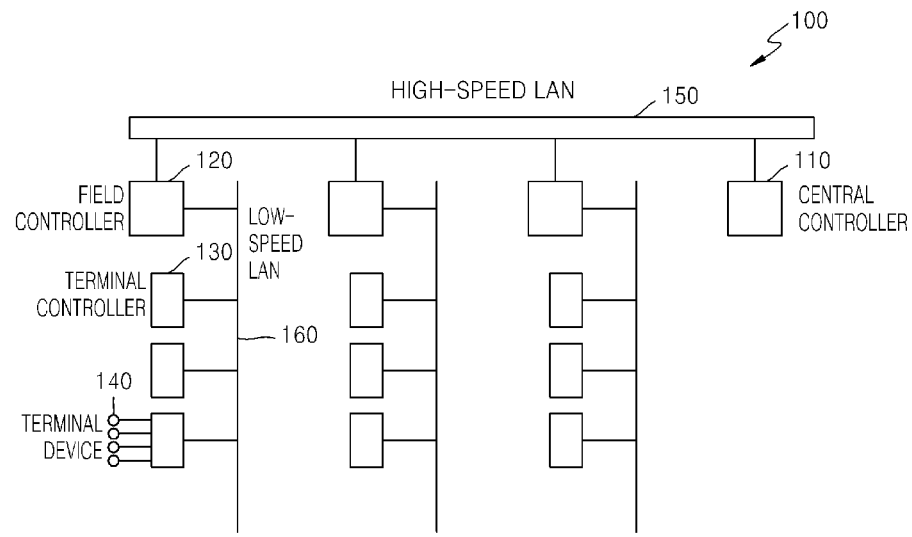
FIG. 1 is a diagram illustrating a structure of a conventional energy management system.

The present invention will now be described more fully with reference to the accompanying drawings, in which exemplary embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those of ordinary skill in the art. In the following description, well-known functions or constructions are not described in detail if it is determined that they would obscure the invention due to unnecessary detail. The same reference numerals represent the same elements throughout the drawings.

As used herein, expressions such as "at least one of," when preceding a list of elements, modify the entire list of elements and do not modify the individual elements of the list.

Hereinafter, exemplary embodiments of the present invention will be described in greater detail with reference to the accompanying drawings.

Figure 2:
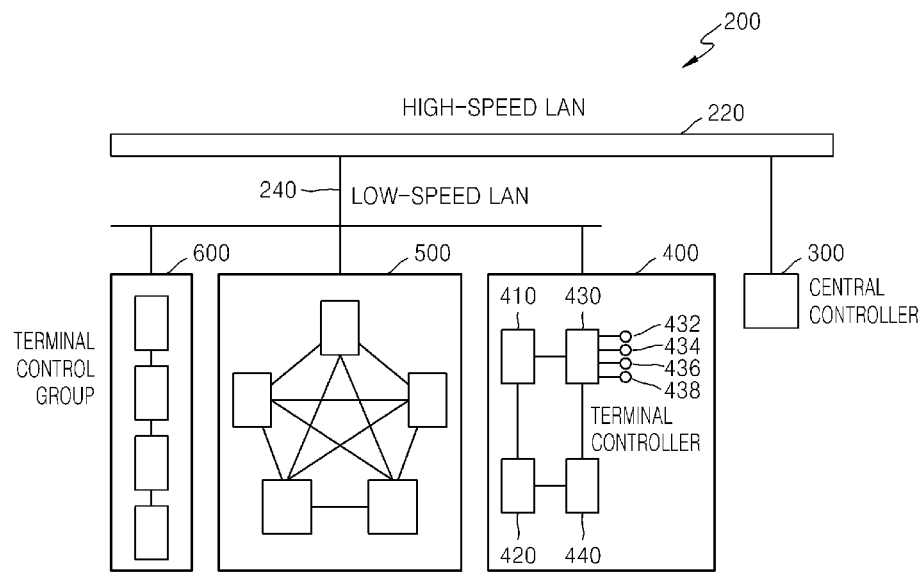
FIG. 2 is a schematic diagram illustrating a structure of an energy management system according to an embodiment of the present invention.

FIG. 2 is a diagram illustrating a structure of an energy management system 200 according to an embodiment of the present invention. The energy management system 200 may be a building energy management system (BEMS) that may be applied to a relatively large building, or may be a home energy management system (HEMS) that may be applied to a relatively small building.

Referring to FIG. 2, the energy management system 200 includes a central controller 300, a plurality of terminal controllers 410, 420, 430, and 440, and a plurality of terminal devices 432, 434, 436, and 438. The central controller 300 may communicate with the plurality of terminal controllers 410, 420, 430, and 440 via a high-speed local area network (LAN) 220. In an embodiment of the present invention, the central controller 300 may use the high-speed LAN 220 in a section or may use a low-speed LAN 240 in another section to communicate with the plurality of terminal controllers 410, 420, 430, and 440. However, the present invention is not limited thereto and a different type of network may be used.

The plurality of terminal devices 432, 434, 436, and 438 are terminal devices consuming energy, and may include at least one from among, for example, lighting devices, cooling/heating devices, ventilating devices, disaster preventing devices, water supply devices, and sanitary devices. However, the present invention is not limited thereto and the plurality of terminal devices 432, 434, 436, and 438 may be other various types of terminal devices consuming energy within a building or a house.

The plurality of terminal controllers 410, 420, 430, and 440 control the plurality of terminal devices 432, 434, 436, and 438 that consume energy, according to a control command received from the central controller 300. For example, the plurality of terminal controllers 410, 420, 430, and 440 may control supply of power to the plurality of terminal devices 432, 434, 436, and 438 or control the degree of energy consumption in the plurality of terminal devices 432, 434, 436, and 438. For example, when the terminal device 432 is a lighting device, each of the plurality of terminal controllers 410, 420, 430, and 440 may turn on or off the terminal device 432 or may increase or decrease the degree of illumination of the terminal device 432, thereby increasing or decreasing power consumption. In an embodiment of the present invention, the plurality of terminal controllers 410, 420, 430, and 440 may use a network, such as ETHERNET, WIFI, ZIGBEE, RS232, RS 422, or RS485, to control the plurality of terminal devices 432, 434, 436, and 438.

The plurality of terminal controllers 410, 420, 430, and 440 may be set to be included in various types of terminal control groups 400, 500, and 600 under control of the central controller 300. The plurality of terminal controllers 410, 420, 430, and 440 may be constructed to have the same receiving level with respect to the central controller 300. The structures of the terminal control groups 400, 500, and 600 will be described in detail with reference to FIG. 4A to 4C below.

The central controller 300 may change the structures of the terminal control groups 400 to 600 if needed. For example, the central controller 300 may change one or more settings of the energy management system 200 in such a manner that the terminal controller 410 included in the current terminal control group 400 may be included in the terminal control group 500.

To control the terminal device 432, the central controller 300 may generate a control command related thereto and provide the control command to all or at least one of the plurality of terminal controllers 410, 420, 430, and 440 of the terminal control group 400. If the plurality of terminal controllers 410, 420, 430, and 440 of the terminal control group 400 are constructed to have the same receiving level with respect to the central controller 300, the plurality of terminal controllers 410, 420, 430, and 440 may receive a control message directly from the central controller 300.

In an embodiment of the present invention, the central controller 300 may transmit a control command related to the terminal device 432 to all the terminal control groups 400, 500, and 600. In this case, each of terminal controllers included in the terminal control groups 400, 500, and 600 first determines whether the received control command is to be performed by the terminal control group to which each of the terminal controller belongs.

In an embodiment of the present invention, the central controller 300 may insert a group identifier (ID) of the terminal control group 400 into the control command. In this case, the terminal controllers belonging to the terminal control group 500 may determine that the group ID inserted into the control command is not the same as that of the terminal control group 500 to which they belong, and discard the control command. In contrast, the plurality of terminal controllers 410, 420, 430, and 440 of the terminal control group 400 may determine that the group ID inserted into the control command is the same as that of the terminal control group 400 to which they belong, and perform an operation based on the control command.

In an embodiment of the present invention, the central controller 300 may insert a plurality of group IDs into the control command. For example, the central controller 300 may insert both the group ID of the terminal control group 400 and the group ID of the terminal control group 500 into the control command. In this case, the terminal controllers of the terminal control groups 400 and 500 may determine that the control command is to be handled by their terminal control groups, and perform an operation based on the control command. However, terminal controllers included in the terminal control group 600 may determine that a group ID of the terminal control group 600 to which they belong is not inserted into the control command and the control command is thus not to be handled by the terminal control group 600, and then discard the control command.

If the plurality of terminal controllers 410, 420, 430, and 440 receive a control command including a control command related to the terminal device 432, then each of the plurality of terminal controllers 410, 420, 430, and 440 determines whether the received control command is related to a terminal device matching thereto, and handles the received control command or provides the received control command to another terminal controller included in the terminal control group 400, based on a result of the determination. A terminal device matching each of the plurality of terminal controllers 410, 420, 430, and 440 means a terminal device controlled by each of the plurality of terminal controllers 410, 420, 430, and 440. For example, the terminal controller 410 may determine that an object related to the received control command, i.e., the terminal device 432, does match the terminal controller 410 itself, and the terminal controller 410 provides the received control command to another terminal controller included in the terminal control group 400. The terminal controller 430 may determine that the object related to the received control command, i.e., the terminal device 432, matches the terminal controller 430 itself, and control the terminal device 432, based on the received control command.

In an embodiment of the present invention, a control command may include an ID of a terminal device to be controlled. For example, the control command may include an ID of the terminal device 432 to be controlled. The plurality of terminal controllers 410, 420, 430, and 440 receiving the control command may determine whether the terminal device 432 that is to be controlled matches them, based on the ID of the terminal device 432.

In an embodiment of the present invention, a control command transmitted from the central controller 300 may include a plurality of sub control commands for controlling a plurality of terminal devices. For example, the central controller 300 may transmit a control command including a sub control command related to a terminal device matching the terminal controller 410 and a sub control command relating to the terminal device 432. If the terminal controller 430 receives the control command, the terminal controller 430 may determine that the control command includes the sub control command related to the terminal device 432 matching the terminal controller 430 itself, control the terminal device 432, and provide the received control command to another terminal controller included in the terminal control group 400. In this case, the controlling of the terminal device 432 and the providing of the received control command may be simultaneously performed, or one of them may be performed prior to the other. An operation performed by a terminal controller belonging to a terminal control group will be described in detail with reference to FIGS. 4A to 4C below.

Thus, the central controller 300 may construct an energy management system in any of various ways by using groups each consisting of a plurality of terminal controllers. Also, terminal devices consuming energy may be controlled by controlling terminal controllers classified into groups, and thus, it is possible to obtain the same effect as when the terminal devices are controlled in a simple manner by using virtual equipment.

Figure 3:
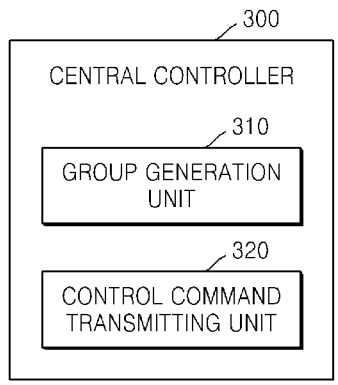
FIG. 3 is a schematic block diagram of a central controller according to an embodiment of the present invention.

FIG. 3 is a schematic block diagram of the central controller 300 of FIG. 2 according to an embodiment of the present invention. Referring to FIG. 3, the central controller 300 includes a group generation unit 310 for generating groups of terminal controllers, and a control command transmitting unit 320 for transmitting control commands related to terminal devices in the energy management system 200.

The group generation unit 310 generates groups each including a plurality of terminal controllers in the energy management system 200. According to an embodiment of the present invention, the group generation unit 310 may classify terminal controllers for controlling terminal devices according to a type of function the terminal controller controls the terminal device to perform, or according to a geographic characteristic of the terminal controller and/or of the terminal device, or according to a combination thereof. For example, the group generation unit 310 may classify terminal controllers for controlling terminal devices that perform the same operation into one group. For example, the group generation unit 310 may classify all terminal controllers that control lighting devices in the energy management system 200 into one group. According to another embodiment of the present invention, the group generation unit 310 may classify terminal controllers that control terminal devices located adjacent to one another into one group. For example, the group generation unit 310 may classify all terminal controllers that control terminal devices located on a first floor of a building into one group. According to another embodiment of the present invention, the group generation unit 310 may classify all terminal controllers that control terminal devices, which are located adjacent to one another and perform the same operation, into one group. However, the present invention is not limited thereto and the classification scheme may be of other various types and/or combinations. For example, the group generation unit 310 may classify all terminal controllers that control terminal devices which utilize a same network type, such as ETHERNET, WIFI, ZIGBEE, RS232, RS 422, or RS485, to control the plurality of terminal devices. Alternatively, the group generation unit 310 may classify all terminal controllers that control terminal devices which consume a substantially similar amount of energy, i.e., the terminal devices consume energy at a similar rate.

The control command transmitting unit 320 transmits a control command related to a terminal device, which is to be controlled, to a terminal controller. As described above with reference to FIG. 1, according to a conventional method, the central controller 110 transmits a control command to the field controller 120, and thus, all terminal devices controlled by the field controller 120 cannot be controlled when the field controller 120 malfunctions. However, according to an embodiment of the present invention, the control command transmitting unit 320 transmits a control command to a plurality of terminal controllers. Then, each of the terminal controllers checks the control command, performs controlling based on the control command when the control command includes a control command related to a terminal device matching each of the terminal controllers, and transmits the control command to a neighboring terminal controller when the control command includes a control command related to a terminal device that does not match each of the terminal controllers. According to an embodiment of the present invention, the control command transmitting unit 320 may broadcast a control command. In this manner, a control command may be provided to a terminal controller that should handle the control command, via any of various routes. The structure of a plurality of terminal controllers and an operation of exchanging a control command will now be described in detail with reference to FIGS. 4A to 4C.

Figure 4A:
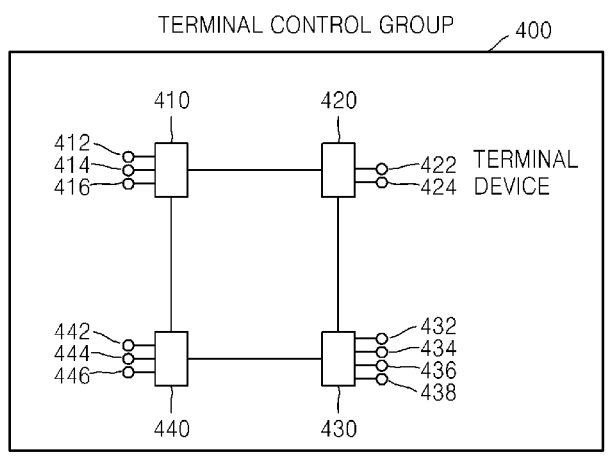
FIGS. 4A to 4D are diagrams illustrating various terminal control groups each including terminal controllers, according to embodiments of the present invention.
Figure 4B:
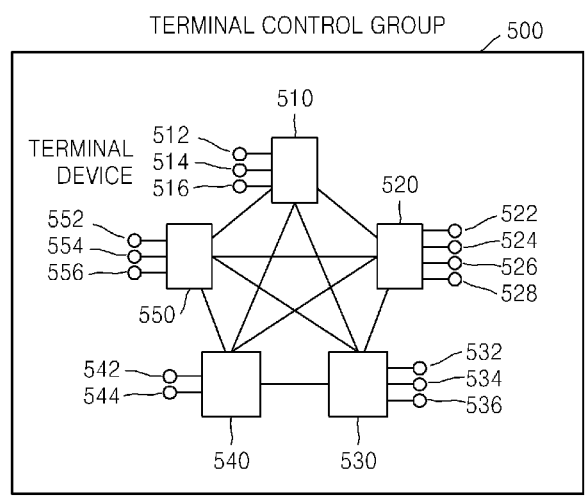
Figure 4C:
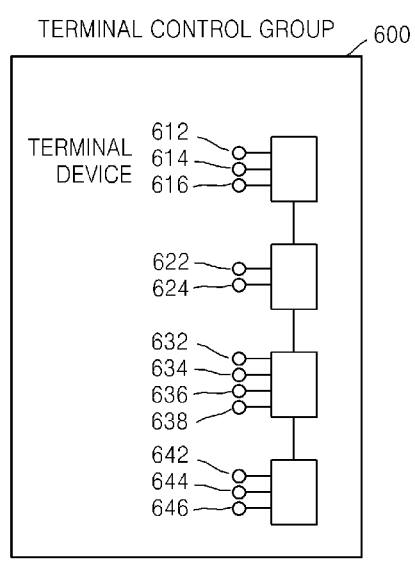

FIGS. 4A to 4C are diagrams illustrating various terminal control groups each including terminal controllers, according to embodiments of the present invention.

Referring to FIG. 4A, a terminal control group 400 includes a plurality of terminal controllers 410, 420, 430, and 440. Each of the plurality of terminal controllers 410 to 440 controls at least one terminal device matching each of the plurality of terminal controllers 410 to 440. For example, the terminal controller 410 controls terminal devices 412, 414, and 416. That the terminal devices 412, 414, and 416 match the terminal controller 410 means that they are under control of the terminal controller 410.

As illustrated in FIG. 4A, according to an embodiment of the present invention, the plurality of terminal controllers 410, 420, 430, and 440 belonging to the terminal control group 400 may be connected in a ring fashion. In this case, the terminal controller 410 is connected directly to the terminal controller 420 and the terminal controller 440 but is not directly connected to the terminal controller 430. In the present specification, that the terminal controller 410 is connected directly to the terminal controller 420 should be understood to mean that a terminal controller is not present between the terminal controller 410 and the terminal controller 420, and that the terminal controller 410 and the terminal controller 420 are connected to each other should be understood to mean that the terminal controller 410 and the terminal controller 420 are electrically connected to each other via another device other than a terminal controller.

Referring to FIG. 4A, the plurality of terminal controllers 410, 420, 430, and 440 may have the same receiving level with respect to a central controller (not shown). For example, all the plurality of terminal controllers 410, 420, 430, and 440 may receive a control command from the central controller. However, any one of the plurality of terminal controllers 410, 420, 430, and 440 may receive the control command earlier than the other terminal controllers according to network or device performance. According to an embodiment of the present invention, the central controller may transmit a control command to at least one terminal controller, e.g., the terminal controller 410, from among the plurality of terminal controllers 410, 420, 430, and 440.

Each of the plurality of terminal controllers 410, 420, 430, and 440 may transmit a control command received from the central controller to the other terminal controllers belonging to the terminal control group 440. For example, when the terminal controller 410 receives a control command including a sub control command related to a terminal device 432, the terminal controller 410 may transmit the control command to the other terminal controllers 420, 430, and 440. According to an embodiment of the present invention, each of the plurality of terminal controllers 410, 420, 430, and 440 may broadcast a control command to the other terminal controllers.

According to an embodiment of the present invention, the terminal controller may transmit a received control command to neighboring terminal controllers connected thereto from among terminal controllers belonging to a terminal control group to which the terminal controller belongs. For example, referring to FIG. 4A, when the terminal controller 410 receives a control command including a sub control command related to the terminal device 432 from the central controller 300, the terminal controller 410 may transmit the control command to neighboring terminal controllers connected thereto, e.g., the terminal controllers 420 and 440. In this case, the terminal controllers 420 and 440 receiving the control command from the terminal controller 410 may determine that the terminal device 432 does not match the terminal controllers 420 and 440, and therefore transmit the control command to a neighboring terminal controller connected thereto, e.g., the terminal controller 430. In this case, since the terminal controllers 420 and 440 receive the control command from the terminal controller 410, they do not transmit the control command to the terminal controller 410 although the terminal controller 410 is a neighboring terminal controller thereof. The terminal controller 430 determines that the control command received from the terminal controller 420 or the terminal controller 440 includes the sub control command related to the terminal device 432 matching the terminal controller 430 itself, and controls the terminal device 432, based on the sub control command related to the terminal device 432.

According to an embodiment of the present invention, if each of the plurality of terminal controllers 410 to 440 receives a control command including a sub control command related to a terminal device matching each of the plurality of terminal controllers 410 to 440 from the central controller 300, then each of the plurality of terminal controllers 410 to 440 controls the matching terminal device.

According to an embodiment of the present invention, if each of the plurality of terminal controllers 410 to 440 receives a control command including a sub control command related to a terminal device matching each of the plurality of terminal controllers 410 to 440 and a sub control command related to a terminal device matching another terminal controller, from the central controller 300 or another terminal controller, then each of the plurality of terminal controllers 410, 420, 430, and 440 controls the matching terminal device and transmits the control command to the other terminal controllers. In this case, the controlling of the terminal device and the providing of the control command may be performed simultaneously, or one of them may be performed prior to the other. For example, when a control command that the terminal controller 410 receives from a server (not shown) includes a sub control command related to the terminal device 412 and a sub control command related to the terminal device 432, the terminal controller 410 controls the terminal device 412 together with providing the control command to the terminal controllers 420 and 440.

According to an embodiment of the present invention, when each of the plurality of terminal controllers 410, 420, 430, and 440 receives a control command that is the same as that which it has already handled, from the central controller or another terminal controller, each of the plurality of terminal controllers 410, 420, 430, and 440 may discard the control command, as will be described in detail with reference to FIG. 4C below.

FIG. 4B is a diagram illustrating a terminal control group 500 including five terminal controllers 510, 520, 530, 540, and 550, according to another embodiment of the present invention. Referring to FIG. 4B, the terminal controllers 510 to 550 are connected in a mesh fashion. In other words, referring to FIG. 4B, the terminal controllers 510 to 550 included in the terminal control group 500 are connected directly to one another. Operations of the terminal controllers 510 to 550 included in the terminal control group 500 are as described above with reference to FIG. 4A.

FIG. 4C is a diagram illustrating a terminal control group 600 including four terminal controllers 610, 620, 630, and 640, according to another embodiment of the present invention. Referring to FIG. 4C, the terminal controllers 610 to 640 included in the terminal control group 600 are connected in linear fashion. As described above, when each of the terminal controllers 610 to 640 receives a control command that is the same as that which it has already handled, from a central controller (not shown) or another terminal controller, each of the plurality of terminal controllers 610 to 640 may discard the control command. For example, when the terminal controller 610 and the terminal controller 640 receive a control command related to a terminal device 622, the control command is first transmitted to the terminal controller 620 via the terminal controller 610 and is then also transmitted to the terminal controller 620 via the terminal controller 640 and the terminal controller 630. Thus, the terminal controller 620 may control the terminal device 622 based on the control command that was first received from among the two control commands, and discard the other control command since the same control command has already been handled.

Figure 4D:
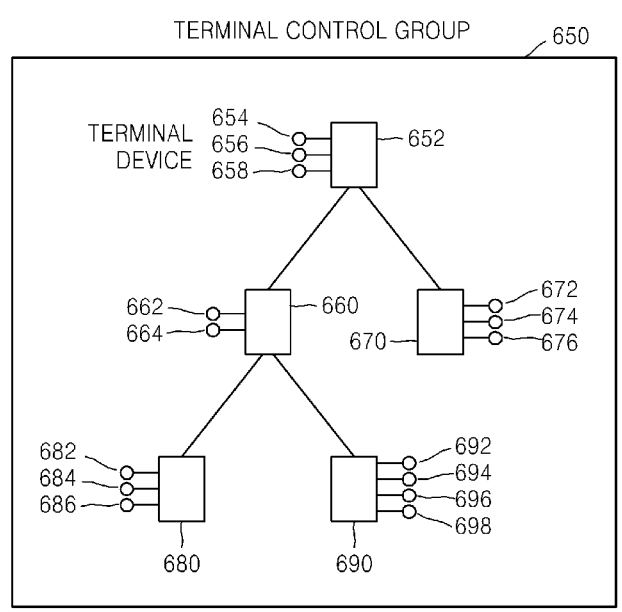

FIG. 4D is a diagram illustrating a terminal control group 650 including five terminal controllers 652, 660, 670, 680, and 690, according to another embodiment of the present invention. Referring to FIG. 4D, the terminal controllers 652, 660, 670, 680, and 690 are connected in a tree fashion. Under the arrangement shown in FIG. 4D, the terminal controllers 660 and 670 are connected to the terminal controllers 652, which is an upper level terminal controller of the terminal controllers 660 and 670, and the terminal controller 660 is connected to the terminal controllers 680 and 690, which are lower level terminal controllers of the terminal controller 660. Operations of the terminal controllers 652, 660, 670, 680, and 690 included in the terminal control group 650 are as described above with reference to FIG. 4A.

However, connection fashions of terminal controllers included in a terminal control group is not limited to connection fashions illustrated in FIG. 4A through 4D and may be implemented in various fashions according to a user's need. For example, an energy management system may include a plurality of terminal control groups, wherein each of the terminal control groups may have identical structures, or different structures, or various combinations thereof.

Figure 5:
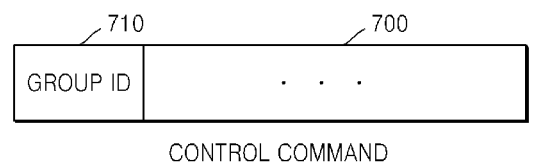
FIG. 5 is a schematic diagram illustrating a packet structure of a control command transmitted from a central controller, according to an embodiment of the present invention.

FIG. 5 is a schematic diagram illustrating a packet structure of a control command 700 transmitted from the central controller 300 of FIG. 3, according to an embodiment of the present invention. Referring to FIG. 5, the control command 700 includes a group ID 710. The group ID may refer to an ID of a control unit group including a terminal controller matching a terminal device that the central controller 300 will control using the control command 700. According to an embodiment of the present invention, the control command 700 may include a plurality of group IDs 710.

A terminal controller receiving the control command 700 may discard the control command 700 when it determines that the ID of the terminal control group is not included in the control command, based on an ID of a terminal control group to which the terminal controller belongs to, according to the group ID 710. For example, if terminal controller 410 receives a control command which includes a group ID corresponding to terminal control group 500 including a terminal controller matching a terminal device within terminal control group 500, then terminal controller 410 may discard the control command. If the ID of the terminal control group to which the terminal controller belongs to is included in the control command 700 or is the same as the group ID 710, then the terminal controller performs an operation according to the control command 700. In this case, the operation according to control command 700 may include at least one of controlling a terminal device matching the terminal controller and transmitting the control command 700 to another terminal controller.

According to an embodiment of the present invention, the control command 700 may include at least one terminal device ID (not shown) of at least one terminal device to be controlled. The control command 700 transmitted from the central controller 300 of FIG. 3 may have a similar packet structure as illustrated in FIG. 5, which contains the at least one terminal device ID. In this case, a terminal controller receiving the control command 700 determines whether a terminal device ID of a terminal device matching the terminal controller itself is present from among the at least one terminal device ID included in the control command 700, performs a corresponding control operation when the matching terminal device ID is present, and transmits the control command to another terminal controller when the matching terminal device ID is not present.

Figure 6:
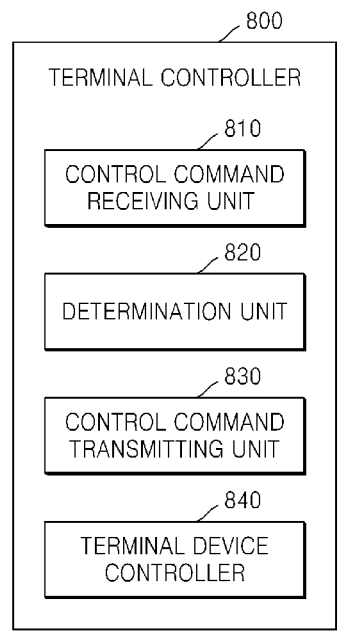
FIGS. 6 and 7 are schematic block diagrams of terminal controllers according to embodiments of the present invention.

FIG. 6 is a schematic block diagram of a terminal controller 800 according to an embodiment of the present invention. Referring to FIG. 6, the terminal controller 800 includes a control command receiving unit 810, a determination unit 820, a control command transmitting unit 830, and a terminal device controller 840.

The control command receiving unit 810 receives a control command from the central controller 300 of FIG. 3 or another terminal controller. The control command may include a sub control command related to at least one terminal device.

The determination unit 820 determines whether the control command includes a sub control command related to a terminal device matching the terminal controller 800.

If the determination unit 820 determines that the control command does not include a sub control command related to a terminal device matching the terminal controller 800, the control command transmitting unit 830 transmits the control command to another terminal controller included in a terminal control group to which the terminal controller 800 belongs.

If the determination unit 820 determines that the control command includes a sub control command related to a terminal device matching the terminal controller 800, the terminal device controller 840 controls the matching terminal device.

According to a conventional method, referring to FIG. 1, the terminal controller 130 receives a control command only from the field controller 120, and all terminal devices controlled by the field controller 120 cannot be controlled when the field controller 120 malfunctions. However, according to an embodiment of the present invention, a plurality of terminal controllers may transmit a control command received from the central controller 300. Thus, even if one of the plurality of terminal controllers malfunctions, a terminal device that is to be controlled may be controlled via a route that does not include the malfunctioning terminal controller.

For example, referring to FIG. 4A, when the terminal controller 410 receives a control command including a sub control command related to the terminal device 432 from the central controller 300, the terminal controller 410 may transmit the control command to neighboring terminal controllers connected thereto, e.g., the terminal controllers 420 and 440. In this case, even if one of the terminal controllers 420 and 440 is malfunctioning, the remaining operable terminal controller will receive the control command from the terminal controller 410, and therefore may transmit the control command to a neighboring terminal controller connected thereto, e.g., the terminal controller 430. The terminal controller 430 may then determine that the control command received from the remaining operable terminal controller includes the sub control command related to the terminal device 432 matching the terminal controller 430 itself, and may control the terminal device 432, based on the sub control command related to the terminal device 432.

Figure 7:
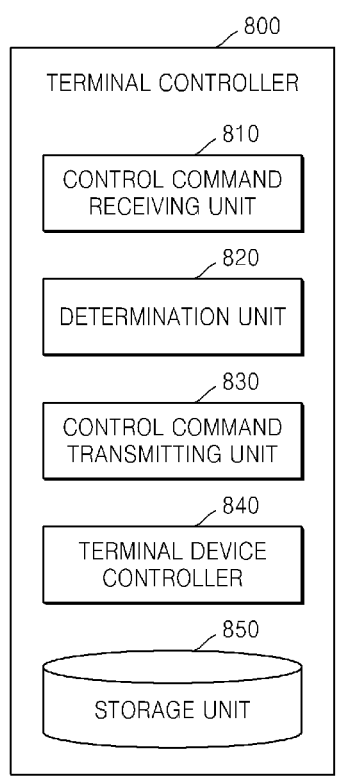

FIG. 7 is a schematic block diagram of a terminal controller 800 according to another embodiment of the present invention. Referring to FIG. 7, the terminal controller 800 includes a control command receiving unit 810, a determination unit 820, a control command transmitting unit 830, a terminal device controller 840, and a storage unit 850.

The operations of the control command receiving unit 810, the determination unit 820, the control command transmitting unit 830, and the terminal device controller 840 are as described above with reference to FIG. 6.

The determination unit 820 determines whether a control command that the terminal controller 800 receives should be handled by a terminal control group to which the terminal controller 800 belongs. According to an embodiment of the present invention, the determination unit 820 may discard the control command when it is determined that the control command is not to be handled by the terminal control group to which the terminal controller 800 belongs, based on a group ID included in the control command and an ID of the terminal control group to which the terminal controller 800 belongs.

The storage unit 850 may store the ID of the terminal control group to which the terminal controller 800 belongs. The storage unit 850 may be any recording apparatus or device capable of storing data that is read by a computer system, e.g., a read-only memory (ROM), a random access memory (RAM), a hard disk, a compact disc (CD)-ROM, a digital versatile disc (DVD), a magnetic tape, a floppy disk, an optical data storage device, flash memory, and so on. The determination unit 820 determines whether the control command should be handled by the terminal control group to which the terminal controller 800 belongs, based on the ID of the terminal control group, stored in the storage unit 850. If the determination unit 820 determines that the control command does not include the ID of the terminal control group to which the terminal controller 800 belongs, then the terminal controller 800 may determine that the control command is not to be handled by the control unit group to which the terminal controller 800 belongs, and discard the control command.

The storage unit 850 may further store information about neighboring terminal controllers connected to the terminal controller 800 from among a plurality of terminal controllers included in the terminal control group to which the terminal controller 800 belongs. According to an embodiment of the present invention, the stored information about the neighboring terminal controllers may be internet protocol (IP) address information of the neighboring terminal controllers. The terminal controller 800 may transmit a control command to the neighboring terminal controllers, based on the information about the neighboring terminal controllers that is stored in the storage unit 850.

The storage unit 850 may further store information about terminal devices matching the terminal controller 800. The matching terminal devices may refer to terminal devices that are under the control of the terminal controller 800. The determination unit 820 determines whether a received control command includes a sub control command related to a terminal device matching the terminal controller 800, based on the information about the matching terminal devices stored in the storage unit 850.

In the conventional method, a workload of or the degree of difficulty of works that the field controller 120 of FIG. 1 should perform may be high according to the characteristics of a terminal controller to be newly added, changed, or removed. However, when such terminal controllers according to an embodiment of the present invention are employed, it is possible to more easily add, change, or remove a terminal controller.

Figure 8:
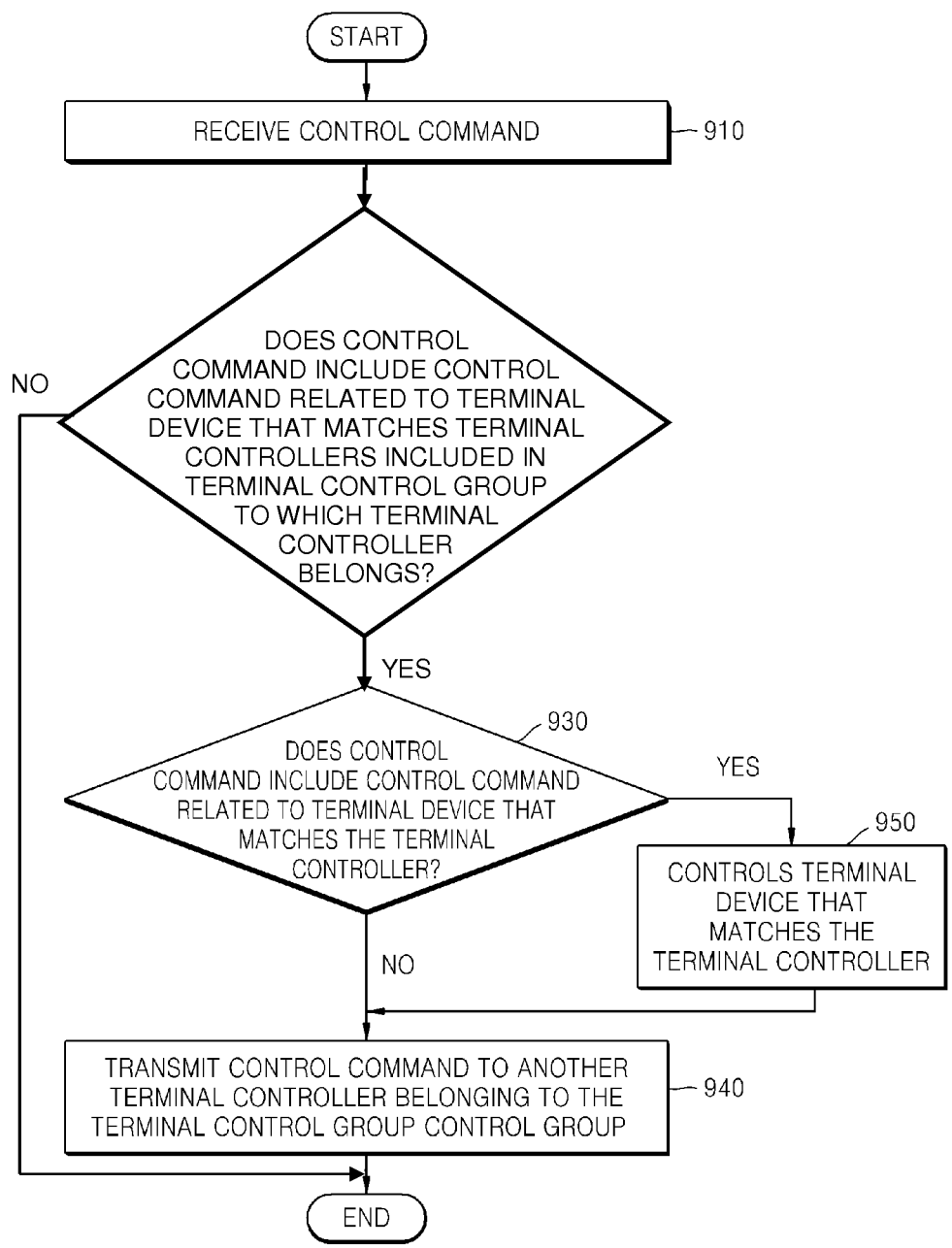
FIG. 8 is a flowchart illustrating a method of receiving and handling a control command, performed by a terminal controller, according to an embodiment of the present invention.

FIG. 8 is a flowchart illustrating a method of receiving and handling a control command, performed by a terminal controller, according to an embodiment of the present invention. Referring to FIG. 8, in operation 910, the terminal controller receives a control command from a central controller.

In operation 920, the terminal controller determines whether the control command includes a sub control command related to a terminal device matching a terminal controller included in a terminal control group to which the terminal controller belongs.

If it is determined in operation 920 that the control command includes a control command related to a terminal device matching the terminal controllers included in the terminal control group to which the terminal controller belongs, then the terminal controller performs operation 930. If it is determined in operation 920 that the control command does not include a control command related to a terminal device matching the terminal controllers included in the terminal control group to which the terminal controller belongs, then the terminal controller discards the control command.

In operation 930, the terminal controller determines whether the control command includes a sub control command related to a terminal device matching the terminal controller itself.

If it is determined in operation 930 that the control command includes a sub control command related to a terminal device matching the terminal controller, the terminal controller performs operation 950. If it is determined in operation 930 that the control command does not includes a sub control command related to a terminal device matching the terminal controller, the terminal controller performs operation 940.

In operation 950, the terminal controller controls the terminal device matching the terminal controller itself, based on the control command.

In operation 940, the terminal controller transmits the control command to another terminal controller belonging to the terminal control group to which the terminal controller belongs.

With a terminal controller and a central controller according to the one or more aspects of the present invention, it is possible to construct equipment and a network for controlling terminal devices which consume energy in an efficient manner. Further, new equipment may be added, and a change in system construction may be performed, in a simple manner.

To control terminal devices consuming energy, terminal controllers may be grouped according to various schemes. Thus, it is possible to efficiently use terminal devices in the same way as when virtual control equipment is used.

The method and apparatus for managing energy through virtualization according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The method for managing energy through virtualization maybe embodied as computer readable code recorded in a non-transitory computer readable medium, including program instructions to implement various operations embodied by a computer. The media may also include, alone or in combination with the program instructions, data files, data structures, and the like. Here, the non-transitory computer readable medium may be any recording apparatus capable of storing data that is read by a computer system, e.g., a read-only memory (ROM), a random access memory (RAM), a hard disk, a compact disc (CD)-ROM, a digital versatile disc (DVD), a magnetic tape, a floppy disk, an optical data storage device, flash memory, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A first terminal control apparatus used to control at least one terminal device that consumes energy in an energy management system, the first terminal control apparatus comprising:
   a control command receiving unit to receive a control command related to a first terminal device from at least one of a central control apparatus and a second terminal control apparatus included in the energy management system, wherein the control command includes a group identifier (ID) identifying a terminal control group and a terminal identifier (ID) identifying the first terminal device;
   a determination unit to determine whether the first terminal device matches one of a plurality of terminal devices controlled by the first terminal control apparatus;
   a control command transmitting unit to transmit the control command to a third terminal control apparatus, if the determination unit determines that the first terminal device does not match the one of the plurality of terminal devices controlled by the first terminal control apparatus; and
   a terminal device control unit to control the first terminal device, according to the control command, if the determination unit determines that the first terminal device matches the one of the plurality of terminal devices controlled by the first terminal control apparatus, wherein:
the first terminal control apparatus, the second terminal control apparatus, and the third terminal control apparatus are included in the terminal control group,
at least one of the first terminal control apparatus, the second terminal control apparatus, and the third terminal control apparatus controls a plurality of terminal devices,
the determination unit determines whether the control command further includes a sub control command related to a second terminal device, and determines whether the second terminal device matches one of a plurality of terminal devices controlled by the first terminal control apparatus when it is determined that the control command includes a sub control command related to the second terminal device,
the control command transmitting unit transmits the sub control command to the third terminal control apparatus, if the determination unit determines that the second terminal device does not match the one of the plurality of terminal devices controlled by the first terminal control apparatus, and
the terminal device control unit controls the second terminal device, according to the sub control command, if the determination unit determines that the second terminal device matches the one of the plurality of terminal devices controlled by the first terminal control apparatus.

2. The first terminal control apparatus of claim 1, wherein the first terminal control apparatus is connected to other terminal control apparatuses included in the terminal control group, in a ring fashion.

3. The first terminal control apparatus of claim 1, wherein the first terminal control apparatus is connected to other terminal control apparatuses included in the terminal control group, in a mesh fashion.

4. The first terminal control apparatus of claim 1, further comprising a storage unit to store information about at least one terminal device matching the first terminal control apparatus, and
wherein the determination unit determines whether the first terminal device matches the first terminal control apparatus, based on the information about the at least one terminal device.

5. The first terminal control apparatus of claim 1, further comprising a storage unit for storing information about at least one terminal control apparatus connected to the first terminal control apparatus from among the terminal control apparatuses included in the terminal control group, and
wherein the control command transmitting unit transmits the control command to the third terminal control apparatus, based on the information about the at least one terminal control apparatus.

6. The first terminal control apparatus of claim 5, wherein the information about the at least one terminal control apparatus comprises internet protocol (IP) information of the third terminal control apparatus.

7. The first terminal control apparatus of claim 1, wherein the determination unit determines whether the control command is to be handled by the terminal control group, and discards the control command when it determines that the control command is not to be handled by the terminal control group.

8. The first terminal control apparatus of claim 7, wherein the determination unit determines that the control command is to be handled by the terminal control group, based on the group ID of the terminal control group and the terminal ID included in the control command.

9. A method of controlling at least one terminal device that consumes energy in an energy management system, performed by a first terminal control apparatus, the method comprising:
receiving a control command related to a first terminal device from at least one of a central control apparatus and a second terminal control apparatus included in the energy management system, wherein the control command comprises a group identifier identifying a terminal control group and a terminal identifier identifying the first terminal device;
determining whether the first terminal device matches one of a plurality of terminal devices controlled by the first terminal control apparatus;
transmitting the control command to a third terminal control apparatus, if the first terminal device does not match the one of the plurality of terminal devices controlled by the first terminal control apparatus; and
controlling the first terminal device according to the control command if the first terminal device matches the one of the plurality of terminal devices controlled by the first terminal control apparatus,
wherein:
the first terminal control apparatus, the second terminal control apparatus, and the third terminal control apparatus are included in the terminal control group,
at least one of the first terminal control apparatus, the second terminal control apparatus, and the third terminal control apparatus controls a plurality of terminal devices,
the determining of whether the first terminal device matches the first terminal control apparatus comprises determining whether the control command further includes a sub control command related to a second terminal device, and determining whether the second terminal device matches one of a plurality of terminal devices controlled by the first terminal control apparatus when it is determined that the control command includes a sub control command related to the second terminal device,
the method further comprises:
transmitting the sub control command to the third terminal control apparatus, if the second terminal device does not match the one of the plurality of terminal devices controlled by the first terminal control apparatus, and
controlling the second terminal device, according to the sub control command, if the second terminal device matches the one of the plurality of terminal devices controlled by the first terminal control apparatus.

10. The method of claim 9, wherein the terminal control apparatus is connected to other terminal control apparatuses included in the terminal control group, in a ring fashion.

11. The method of claim 9, wherein the terminal control apparatus is connected to other terminal control apparatuses included in the terminal control group, in a mesh fashion.

12. The method of claim 9, further comprising storing information about at least one terminal device matching the first terminal control apparatus, and
wherein the determining of whether the first terminal device matches the first terminal control apparatus comprises determining whether the first terminal device matches the first terminal control apparatus, based on the information about the at least one terminal device.

13. The method of claim 9, wherein the determining of whether the first terminal device matches the first terminal control apparatus comprises determining whether the control command is to be handled by the terminal control group, and discarding the control command when it is determined that the control command is not to be handled by the terminal control group.

14. A non-transitory computer readable recording medium having recorded thereon a computer program for executing a method of controlling at least one terminal device that consumes energy in an energy management system, the method performed by a first terminal control apparatus, the method comprising:

receiving a control command related to a first terminal device from at least one of a central control apparatus and a second terminal control apparatus included in the energy management system, wherein the control command comprises a group identifier identifying a terminal control group and a terminal identifier identifying the first terminal device;

determining whether the first terminal device matches one of a plurality of terminal devices controlled by the first terminal control apparatus;

transmitting the control command to a third terminal control apparatus, if the first terminal device does not match the one of the plurality of terminal devices controlled by the first terminal control apparatus; and controlling the first terminal device according to the control command if the first terminal device matches the one of the plurality of terminal devices controlled by the first terminal control apparatus, wherein:

the first terminal control apparatus, the second terminal control apparatus, and the third terminal control apparatus are included in the terminal control group, at least one of the first terminal control apparatus, the second terminal control apparatus, and the third terminal control apparatus controls a plurality of terminal devices, the determining of whether the first terminal device matches the first terminal control apparatus comprises determining whether the control command further includes a sub control command related to a second terminal device, and determining whether the second terminal device matches one of a plurality of terminal devices controlled by the first terminal control apparatus when it is determined that the control command includes a sub control command related to the second terminal device, the method further comprises:

transmitting the sub control command to the third terminal control apparatus, if the second terminal device does not match the one of the plurality of terminal devices controlled by the first terminal control apparatus, and controlling the second terminal device, according to the sub control command, if the second terminal device matches the one of the plurality of terminal devices controlled by the first terminal control apparatus.

* * * * *